United States Patent [19]

Brown

[11] 4,114,840

[45] Sep. 19, 1978

[54] PARACHUTE CANOPY DEPLOYMENT CONTROL APPARATUS

[75] Inventor: Herbert R. Brown, Monroe County, N.Y.

[73] Assignee: The United States of America as represented by the Secretary of the Air Force, Washington, D.C.

[21] Appl. No.: 844,163

[22] Filed: Oct. 21, 1977

[51] Int. Cl.² .............................................. B64D 17/36
[52] U.S. Cl. .................................................. 244/152
[58] Field of Search ............... 244/152, 149, 145, 142, 244/150

[56] References Cited

U.S. PATENT DOCUMENTS 3,049,322  8/1962  Vlasic ................................... 244/152
3,278,143  10/1966  Engel ................................... 244/150

Primary Examiner—Barry L. Kelmachter
Attorney, Agent, or Firm—Joseph E. Rusz; Richard J. Killoren

[57] ABSTRACT

A system for controlling the deployment of a parachute canopy having a pair of reinforcement ribbons secured to the canopy. The lower edge of the canopy is turned inward and has reefing rings which engage a reefing line that passes through reefing rings secured to the upper reinforcement ribbon. An anti-inversion netting is secured to the outer surface of the canopy adjacent the lower reinforcement ribbon; the anti-inversion netting has control lines connected to the lower edge adjacent alternate radial seams. The control lines have reefing rings which engage the reefing line. Suspension line guide rings secure the netting to the suspension lines at radial seams between those having the anti-inversion netting control lines.

3 Claims, 8 Drawing Figures

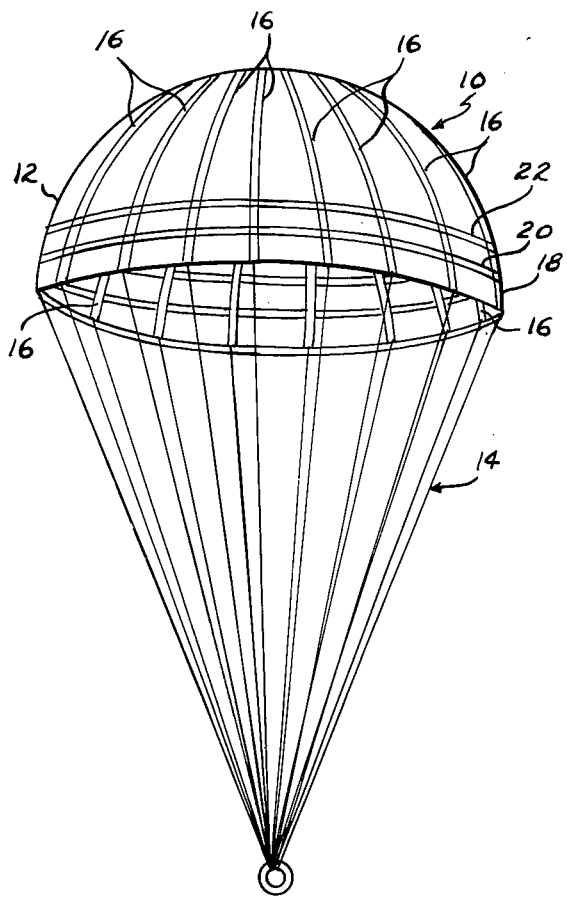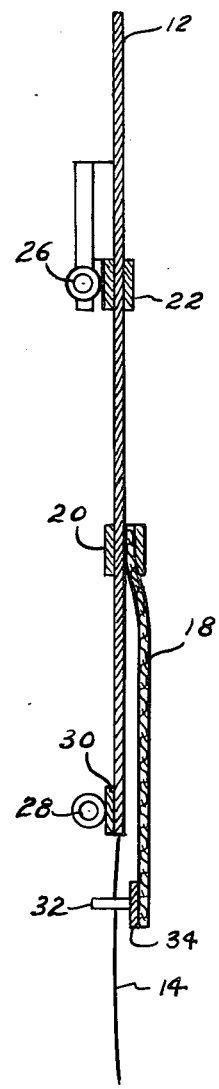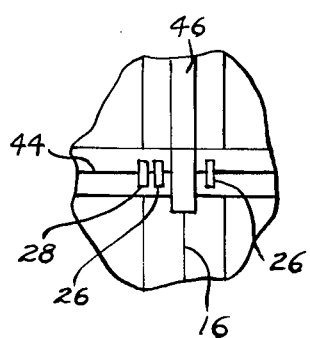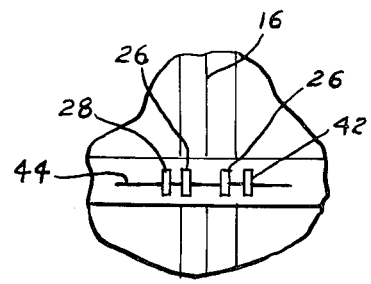

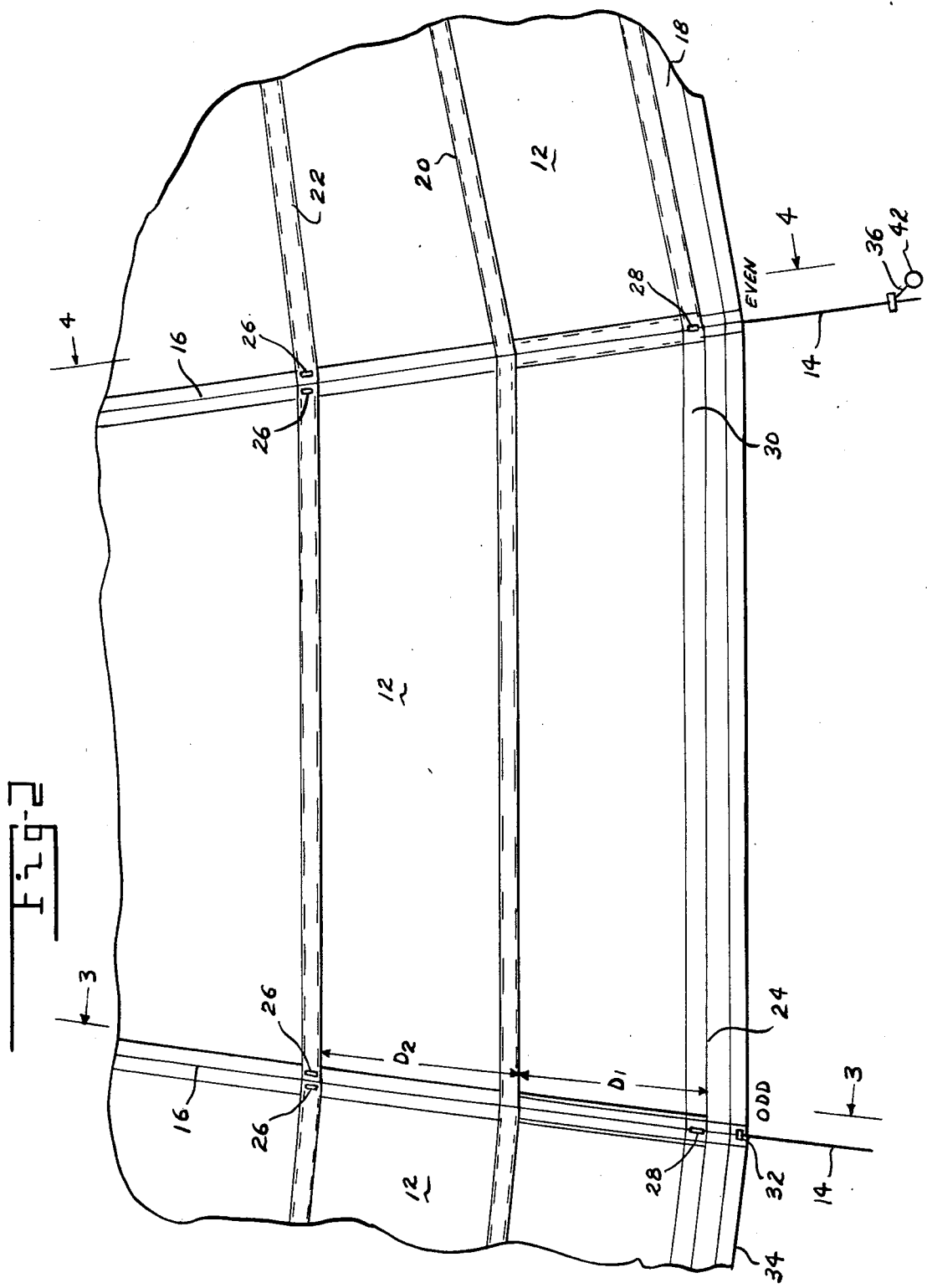

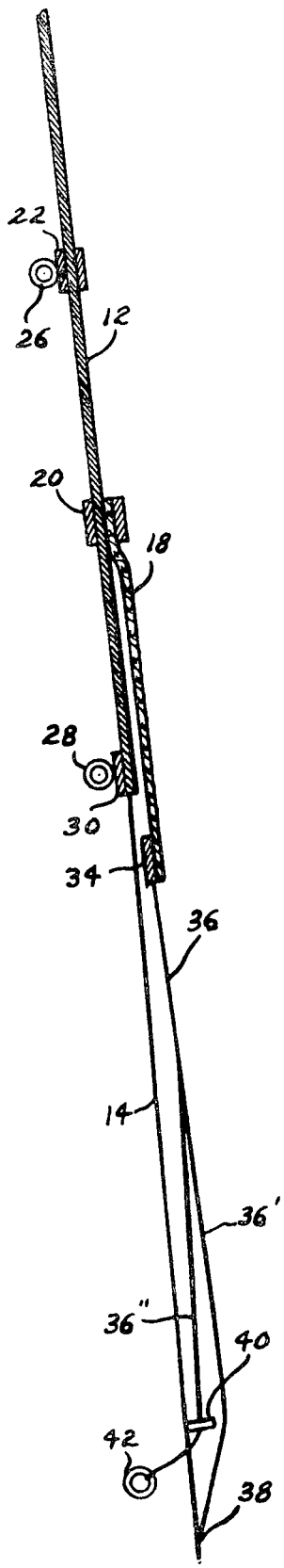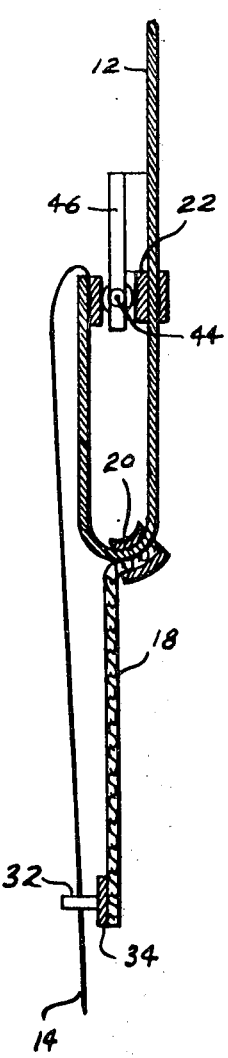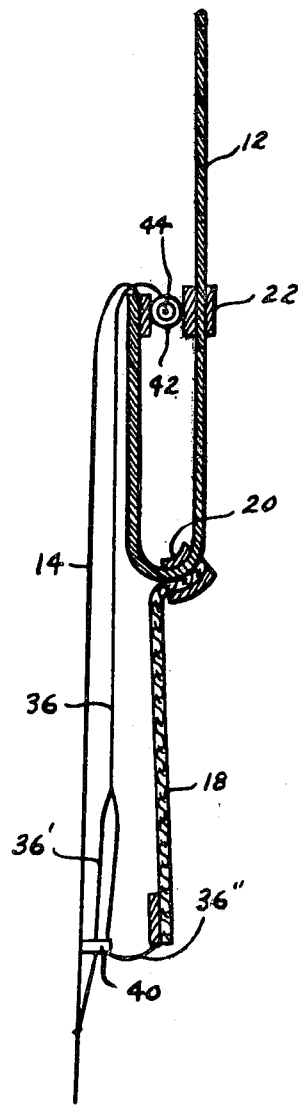

PARACHUTE CANOPY DEPLOYMENT CONTROL APPARATUS

RIGHTS OF THE GOVERNMENT

The invention described herein may be manufactured and used by or for the Government of the United States for all governmental purposes without the payment of any royalty.

BACKGROUND OF THE INVENTION

This invention relates to a parachute deployment system.

There is a constant effort to develop parachute systems which will shorten the deployment time and to reduce or eliminate the problem of parachute inversion. It has been proposed to secure netting to the lower edge of the parachute canopy to reduce the chance of parachute inversion. Various other parachute systems have been employed to overcome the problems in parachute deployment.

The patents to Hensley, U.S. Pat. No. 3,586,269, and Brockelmann, U.S. Pat. No. 3,726,500, show systems relating to the problems of parachute deployment.

BRIEF SUMMARY OF THE INVENTION

According to this invention, two parachute reinforcing ribbons are sewn to the parachute canopy such that the distance of the second ribbon from the first ribbon is equal to the distance between the first ribbon and the edge of the parachute canopy. A pair of reefing rings are sewn inside the canopy to the second reinforcement ribbon on opposite sides of each radial seam. Reefing rings are also sewn inside the canopy edge band at each radial seam. A parachute anti-inversion netting is sewn to the outer surface of the parachute canopy along the first reinforcing ribbon and extends below the bottom edge of the canopy.

The bottom edge of the parachute canopy is turned in and a reefing line passes through the reefing rings inside the second reinforcement ribbon and the reefing rings at the bottom edge of the canopy. Netting control lines are connected to the lower edge of the anti-inversion netting at alternate radial seams. Each netting control line has a reefing ring which engages the reefing line adjacent the second reinforcement ribbon. The anti-inversion netting is secured to the parachute suspension lines with suspension line guide rings at the radial seams between those having the netting control lines.

IN THE DRAWINGS

FIG. 1 is a partially schematic isometric view of a parachute according to the invention.

FIG. 2 is an enlarged partially schematic cut away view showing details of the device of FIG. 1.

FIG. 3 is an enlarged partially schematic sectional view of the device of FIG. 2 along the line 3—3.

FIG. 4 is an enlarged partially schematic sectional view of the device of FIG. 2 along the line 4—4.

FIG. 5 is a partially schematic view showing the canopy portion of FIG. 3 with the canopy in its reefed state.

FIG. 6 shows the positioning of the reefing rings and reefinglines in the device of FIG. 5.

FIG. 7 is a partially schematic view showing the canopy portion of FIG. 4, with the canopy in its reefed state.

FIG. 8 shows the positioning of the reefing rings and reefing line in the device of FIG. 7.

DETAILED DESCRIPTION OF THE INVENTION

Reference is now made to FIG. 1 of the drawing which shows a parachute 10 having a parachute canopy 12 with suspension lines 14 secured to each of the radial seams 16 of the parachute canopy. An anti-inversion netting 18 is secured to the other surface of the parachute canopy along a first reinforcing ribbon 20. A second reinforcing ribbon 22 is secured to the parachute canopy a distance $D_2$ equal to the distance $D_1$ between the first ribbon and the edge 24 of the canopy, as shown in FIG. 2.

A pair of reefing rings 26 are secured to the reinforcement ribbon 22 at each radial seam 16. Reefing rings 28 are secured to the canopy skirt band 30 at each radial seam 16.

At alternate radial seams, hereinafter designated as odd radial seams with odd suspension lines, as shown in greater detail in FIG. 3, suspension line guide rings 32 are secured to the anti-inversion netting edge band 34. The corresponding suspension lines 14 pass through the guide rings to position the anti-inversion netting. At the other radial seams, hereinafter designated as even radial seams with even suspension lines, as shown in greater detail in FIG. 4, an anti-inversion netting control line 36 is secured to the edge band 34. The control lines 36 are Y shaped lines and have one leg 36' connected to the suspension lines 14 at 38. The second leg 36" of each Y passes through a guide ring 40, secured to the suspension lines 14, is secured to a reefing ring 42.

In the reefing of the parachute the lower edge of the canopy is turned inward and the rings 28 are brought into alignment with rings 26 as shown in FIGS. 5 and 6. The reefing line 44 is then passed through all of the rings.

The reefing line 44 passes through a conventional reefing line pencil cutter 46, which is secured to the parachute canopy adjacent one of the radial seams 16.

At the even seams, the ring 42 and the ring 28 are brought into alignment with rings 26 with the rings as shown in FIGS. 7 and 8. The reefing line 44 passes through all of these rings. As the ring 42 is brought into alignment with rings 26, the control line 36 is drawn through guide ring 40 as shown in FIG. 7.

In the operation of the device of the invention when the parachute canopy is reefed, the lower portion of the canopy is turned inward and the rings 28 are brought into alignment with the rings 26 as shown in FIG. 6. At the even seams, the rings 42 are also brought into alignment with rings 26 as shown in FIG. 8. The reefing line 44 is passed through all of the reefing rings and through the pencil cutter 46. The reefing line is then drawn up and tied. This leaves the anti-inversion netting 18 extending below the canopy skirt as shown in FIGS. 5 and 7. The netting 18 is secured to the odd suspension lines 14 by means of ring 32 and to the even suspension lines 14 by rings 40 and control lines 36. Upon deployment of the parachute, the internal reefing with the canopy drawn up decreases the effective length of the suspension lines and reduces the effective canopy diameter. This allows faster canopy deployment since the suspension lines are shorter and faster parachute development since the volume of air necessary, to initially inflate the canopy, is reduced. As the force on the suspension lines increases beyond the radial forces to inflate the canopy, the canopy skirt will be pulled down, thus pulling down on the reefing line and causing the effective circumference of the reefing line to be reduced which reduces the high speed parachute opening loads. After the reefing line is cut by the pencil cutter, the netting 18 prevents the canopy skirt from passing through the lines and thus prevents canopy inversion.

There is thus provided a parachute system which will decrease the deployment time and which will substantially reduce the problem of parachute inversion.

I claim:

1. In combination with a parachute system having a parachute canopy with a skirt band around the bottom thereof and a plurality of radial seams with a parachute suspension line secured to each of said radial seams, comprising: a first reinforcement ribbon secured to said canopy a predetermined distance from the bottom edge of the canopy; a second reinforcement ribbon secured to the canopy a distance from the first ribbon substantially equal to the distance between the first ribbon and the edge of the canopy; an anti-inversion netting secured to the outer surface of said parachute canopy along the first reinforcement ribbon; a reefing line; means for securing the reefing line to said second reinforcement ribbon internally of said canopy adjacent each radial seam; means for securing the lower edge of said canopy to said reefing line; means for securing said anti-inversion netting to said reefing line and to the parachute suspension lines at alternate radial seams and means for connecting the anti-inversion netting to the parachute suspension lines at the radial seams between said alternate radial seams.

2. The device as recited in claim 1 wherein said means for securing the reefing line to the second reinforcement ribbon includes a pair of reefing rings secured to said second reinforcement ribbon adjacent each radial seam with the reefing rings surrounding the reefing line; said means for securing the lower edge of the canopy to the reefing line includes a reefing ring secured to the canopy skirt band adjacent each radial seam and being adapted to surround the reefing line at a position adjacent the reefing rings which are secured to the second reinforcement ribbon.

3. The device as recited in claim 2 wherein said means for securing the anti-inversion netting to the reefing line and to the parachute suspension lines at alternate radial seams includes guide rings secured to the alternate suspension lines and Y shaped control lines passing through said guide rings and connected to the anti-inversion netting adjacent the alternate radial seams; one of the legs of each Y-shaped control line being connected to the corresponding suspension line and the other leg of each Y-shaped control line being connected to a reefing ring adapted to surround the reefing line at a position adjacent the reefing rings secured to the second reinforcement ribbon.

* * * * *